United States Patent
Zessin et al.

(10) Patent No.: US 10,013,246 B2
(45) Date of Patent: *Jul. 3, 2018

(54) DISTRIBUTED INFORMATION HANDLING SYSTEMS AND METHODS FOR AUTOMATIC OBJECT CODE REPLACEMENT AND PATCHING

(71) Applicant: Dell Products, LP, Round Rock, TX (US)

(72) Inventors: Steven P. Zessin, Austin, TX (US); Marissa M. Moore, Austin, TX (US)

(73) Assignee: Dell Products, LP, Round Rock, TX (US)

(*) Notice: Subject to any disclaimer, the term of this patent is extended or adjusted under 35 U.S.C. 154(b) by 7 days.

This patent is subject to a terminal disclaimer.

(21) Appl. No.: 15/399,691

(22) Filed: Jan. 5, 2017

(65) Prior Publication Data

US 2018/0157481 A1 Jun. 7, 2018

Related U.S. Application Data

(63) Continuation-in-part of application No. 15/368,601, filed on Dec. 3, 2016.

(51) Int. Cl.
*G06F 9/44* (2018.01)
*G06F 9/45* (2006.01)
(Continued)

(52) U.S. Cl.
CPC ............... *G06F 8/65* (2013.01); *H04L 67/10* (2013.01); *H04L 67/12* (2013.01); *H04L 69/22* (2013.01);
(Continued)

(58) Field of Classification Search
CPC ......... G06F 17/30598; G06F 17/30864; G06F 19/322; G06F 19/3468; G06F 8/65;
(Continued)

(56) References Cited

U.S. PATENT DOCUMENTS 9,338,148 B2  5/2016 Polehn et al.
9,397,985 B1  7/2016 Seger, II et al.
(Continued)

OTHER PUBLICATIONS

Christian Muller et al., Blockchain: Technology and Applications, Jul. 29, 2016, [Retrieved on Feb. 28, 2018]. Retrieved from the internet: <URL: http://www.softwareresearch.net/fileadmin/src/docs/teaching/SS16/Seminar/Seminar_Paper_Hasic_Mueller.pdf> 31 pp. 1-28.*

(Continued)

*Primary Examiner* — Anibal Rivera
(74) *Attorney, Agent, or Firm* — Singh Law, PLLC; Ranjeev K. Singh

(57) ABSTRACT

Information handling systems (IHS) and methods for automatic object code replacement and patching are provided. A method in an IHS including M devices configured to process at least one algorithm from a set of N algorithms, each having corresponding object code stored in a memory is provided. The method may include automatically determining whether at least one of a subset of the N algorithms requires replacement or a modification and generating at least one of replacement object code for replacing object code corresponding to at least one algorithm requiring replacement or a patch for modifying the object code corresponding to the at least one algorithm. The method may further include automatically providing the replacement object code or the patch for modifying the object code corresponding to the at least one algorithm requiring modification to at least one device using the at least one algorithm.

20 Claims, 9 Drawing Sheets

(51) Int. Cl.
*G06F 9/445* (2018.01)
*G06Q 20/36* (2012.01)
*G06Q 20/40* (2012.01)
*G06F 8/65* (2018.01)
*H04L 29/08* (2006.01)
*H04L 29/06* (2006.01)
*H04L 9/32* (2006.01)

(52) U.S. Cl.
CPC .......... *H04L 9/3236* (2013.01); *H04L 9/3247* (2013.01); *H04L 9/3297* (2013.01)

(58) Field of Classification Search
CPC ............. G06Q 20/401; G06Q 20/3829; G06Q 20/0655; G06Q 20/367; G06Q 20/3678; G06Q 20/065; G06Q 20/3827; H04L 9/3247; H04L 9/3297; H04L 9/3236; H04L 9/12
See application file for complete search history.

(56) References Cited

U.S. PATENT DOCUMENTS

| | | | | |
|---|---|---|---|---|
| 9,608,829 | B2* | 3/2017 | Spanos | H04L 9/3297 |
| 2003/0040855 | A1* | 2/2003 | Pattok | B62D 15/0245 701/32.3 |
| 2008/0163192 | A1* | 7/2008 | Jha | G06F 8/65 717/173 |
| 2009/0070598 | A1* | 3/2009 | Cromer | G06F 21/575 713/193 |
| 2010/0058306 | A1* | 3/2010 | Liles | G06F 21/572 717/168 |
| 2011/0071653 | A1* | 3/2011 | Kihas | G05B 13/048 700/29 |
| 2012/0033804 | A1* | 2/2012 | Soquet | H04L 9/12 380/28 |
| 2015/0057634 | A1* | 2/2015 | Mastrototaro | A61M 5/1723 604/500 |
| 2015/0057807 | A1* | 2/2015 | Mastrototaro | G06F 19/3468 700/275 |
| 2015/0206106 | A1 | 7/2015 | Yago | |
| 2015/0244690 | A1* | 8/2015 | Mossbarger | H04L 63/061 713/171 |
| 2016/0098723 | A1* | 4/2016 | Feeney | G06Q 20/4016 705/75 |
| 2016/0117471 | A1 | 4/2016 | Belt et al. | |
| 2016/0218879 | A1* | 7/2016 | Ferrin | H04L 9/3247 |
| 2016/0292672 | A1 | 10/2016 | Fay et al. | |
| 2016/0292680 | A1 | 10/2016 | Wilson, Jr. et al. | |
| 2016/0300234 | A1* | 10/2016 | Moss-Pultz | G06Q 20/3829 |
| 2016/0321654 | A1* | 11/2016 | Lesavich | G06F 17/30864 |
| 2016/0358169 | A1* | 12/2016 | Androulaki | H04L 9/3236 |
| 2017/0031676 | A1* | 2/2017 | Cecchetti | G06F 8/65 |
| 2017/0046652 | A1* | 2/2017 | Haldenby | G06Q 20/0655 |
| 2017/0046698 | A1* | 2/2017 | Haldenby | G06Q 20/0655 |
| 2017/0048209 | A1* | 2/2017 | Lohe | H04L 63/0442 |
| 2017/0048235 | A1* | 2/2017 | Lohe | G06Q 20/065 |
| 2017/0054611 | A1* | 2/2017 | Tiell | G06F 17/30598 |
| 2017/0083907 | A1* | 3/2017 | McDonough | G06Q 20/065 |
| 2017/0085545 | A1* | 3/2017 | Lohe | H04L 63/062 |
| 2017/0085555 | A1* | 3/2017 | Bisikalo | H04L 63/0807 |
| 2017/0091397 | A1* | 3/2017 | Shah | G06F 19/322 |
| 2017/0091756 | A1* | 3/2017 | Stern | G06Q 20/367 |
| 2017/0109735 | A1* | 4/2017 | Sheng | G06Q 20/3678 |
| 2017/0140375 | A1* | 5/2017 | Kunstel | G06Q 20/40 |
| 2017/0228731 | A1* | 8/2017 | Sheng | G06Q 20/401 |
| 2017/0236120 | A1* | 8/2017 | Herlihy | G06Q 20/3827 705/67 |

OTHER PUBLICATIONS

George Pirlea, A review of the Blockchain literature, Nov. 14, 2016, [Retrieved on Feb. 28, 2018]. Retrieved from the Internet: <URL: http://students.cs.ucl.ac.uk/2016/group15/reports/research.pdf> 13 pp. 1-13.*

Henderson, Bryan, "The Linux Loadable Kernel Module How-To", www.tldp.org/HOWTO/pdf/Module-HOWTO.pdf, Date accessed: Sep. 24, 2016.

"Memory Sections", http://www.nongnu.org/avr-libc/user-manual/mem_sections.html, Date accessed: Sep. 27, 2016, pp. 5.

"Object file", https://en.wikipedia.org/wiki/Object_file, Date accessed: Sep. 27, 2016, pp. 3.

"Optimize Options—Using the GNU Compiler Collection (GCC)", http://gcc.gnu.org/onlinedocs/gcc-4.0.4/gcc/Optimize-Options.html, Date accessed: Sep. 27, 2016, pp. 18.

"Reboot, halt, poweroff—reboot or stop the system", https://linux.die.net/man/8/reboot, Date accessed: Sep. 27, 2016, pp. 2.

"Relocation (computing)", https://en.wikipedia.org/wiki/Relocation_(computing), Date accessed: Sep. 27, 2016; pp. 4.

"Blockchains: The great chain of being sure about things", http://www.economist.com/node/21677228/print, Date published: Oct. 31, 2015, pp. 9.

* cited by examiner

DISTRIBUTED INFORMATION HANDLING SYSTEMS AND METHODS FOR AUTOMATIC OBJECT CODE REPLACEMENT AND PATCHING

REFERENCE TO PRIOR APPLICATION

This application is a continuation-in-part of application Ser. No. 15/368,601, filed Dec. 3, 2016, the disclosure of which is incorporated herein in its entirety by reference.

TECHNICAL FIELD

The present disclosure relates to information handling systems and methods, and in certain examples to distributed information handling systems and methods for automatic object code replacement and patching.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include middleware devices and distributed hosts configured to provide computing or storage resources to users of the information handling systems. Middleware devices may provide intelligence and analytics services closer to the users of the information handling systems. As an example, a middleware device may provide useful results by processing inputs and providing the results to certain users. Because of changes in the relative significance of the inputs or other factors, the results provided by such middleware devices may become stale or otherwise sub-optimal over time.

SUMMARY

In one example, the present disclosure relates to an information handling system (IHS) including M augmented sensors, where M is a positive integer, and where each of the M augmented sensors is configured to process at least a plurality of inputs using at least one algorithm from a set of N algorithms, where N is a positive integer, and where each of the algorithms has a corresponding object code stored in a memory corresponding to at least one of the M augmented sensors. The IHS may further include O controllers, where O is a positive integer, and where each of the O controllers is further configured to, without any direct input from any of L hosts, where L is a positive integer, and where each of the L hosts is configured to provide at least one service to the IHS, automatically determine whether at least one of a subset of the N algorithms requires a modification and generate at least one of replacement object code for replacing object code corresponding to at least one algorithm requiring modification or a patch for modifying the object code corresponding to the at least one algorithm requiring modification, and automatically provide the replacement object code or the patch for modifying the object code corresponding to the at least one algorithm requiring modification to at least one device using the at least one algorithm requiring the modification.

In another aspect, the present disclosure relates to a method in an information handling system (IHS) including M devices, where M is a positive integer, and where each of the M devices is configured to process at least a plurality of inputs using at least one algorithm from a set of N algorithms, where N is a positive integer, and where each of the algorithms has a corresponding object code stored in a memory corresponding to at least one of the M devices. The method may include automatically determining whether at least one of a subset of the N algorithms requires replacement or a modification and generating at least one of replacement object code for replacing object code corresponding to at least one algorithm requiring replacement or a patch for modifying the object code corresponding to the at least one algorithm. The method may further include automatically providing the replacement object code or the patch for modifying the object code corresponding to the at least one algorithm requiring modification to at least one device using the at least one algorithm.

In yet another aspect, the present disclosure relates to a computer-readable medium comprising instructions corresponding to a method in an information handling system (IHS) comprising M devices, where M is a positive integer, and where each of the M devices is configured to process at least a plurality of inputs using at least one algorithm from a set of N algorithms, where N is a positive integer, and where each of the algorithms has a corresponding object code stored in a memory corresponding to at least one of the M devices. The method may include automatically determining whether at least one of a subset of the N algorithms requires replacement or a modification and generating at least one of replacement object code for replacing object code corresponding to at least one algorithm requiring replacement or a patch for modifying the object code corresponding to the at least one algorithm. The method may further include automatically providing the replacement object code or the patch for modifying the object code corresponding to the at least one algorithm requiring modification to at least one device using the at least one algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 1 is a block diagram of a ledger-chained distributed information handling system in accordance with one example.

DETAILED DESCRIPTION

Figure 1:
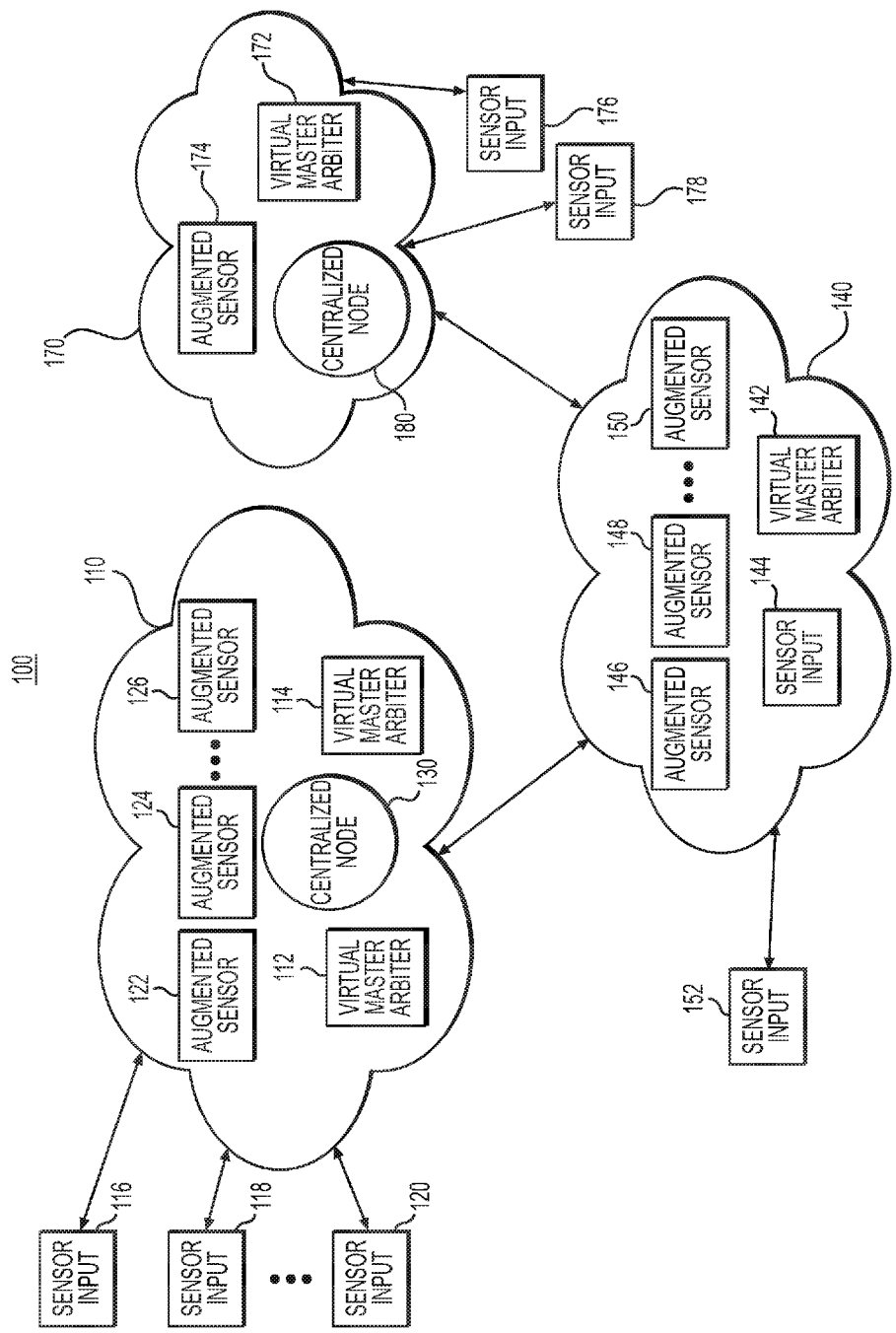

Examples described in this disclosure relate to distributed information handling systems and methods for automatic object code replacement and patching. Certain aspects of such systems and methods rely upon ledger-chained distributed information handling systems and methods. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

There has been exponential growth in the amount of real-time data and the analysis of such real-time data. As an example, the explosion of data streams and influx of changed data from areas such as smart devices, consumer electronics, automobiles, traffic signals, GPS, geospatial data, smart grids, people, animals, air, water, supply chains and any other devices or data that is involved in production, distribution and consumption affects the outcomes of more events. In such a distributed environment of data overload and data changes, the complexity of events that lead to other even more complicated events is unavoidable. In one example, this disclosure relates to managing such a distributed environment by placing more capable middleware devices or sensors between a gateway/node and pure lightweight (read-only) sensors on the edge of the distributed environment. In this example, the middleware sensors may be small yet powerful, e.g., single-chip modules or small form-factor multi-chip modules. Such middleware devices or sensors may use in-memory database solutions (for example, hybrid DRAM/addressable flash systems) to enable real-time analytics and situational awareness of live transaction data rather than rely on after the fact analysis on stale centralized nodes. The relevant data analysis near the edge may rely heavily on the software/firmware algorithm(s) provided initially in the middleware devices. Unpredictability in data trends, however, can lead to an antiquated data analysis algorithm. In this scenario, the data must traverse another step closer to the data-center for it to be properly analyzed, which can introduce latency and stale results. As an example, an algorithm that analyzes worldwide economic trends and feeds the results back into another algorithm that impacts stock market trading may become stale as trends change or other market conditions change. Delinquent analysis of one algorithm may greatly impact the results of another algorithm. To ameliorate such problems, the present disclosure provides various embodiments for managing algorithm changes and then distributing the changes to the algorithms and the live transaction results to the other devices/sensors in a decentralized manner.

Certain examples of the present disclosure relate to ledger-chained distributed information handling systems. In distributed information handling systems, devices closer to an edge of the system, for example, middleware devices in a cloud computing system or augmented sensors in an Internet-of-Things (IoT) system, may process various inputs and generate results for consumption by other devices or users. In certain examples, such devices may be middleware devices for analyzing various inputs, including for example telemetry inputs. In other examples, such devices may be augmented sensors that may not only sense inputs or receive inputs, but also process the inputs based on certain algorithms to generate results. In this example, there may be a request to include a new data variable or a continuous transaction result, perhaps from another node, gateway, or cloud network, into an existing algorithm already running from the memory of a middleware device. Substantially real-time data may be fed back from one or many nodes/gateways/clouds to the relevant middleware device(s) indicating that the middleware device(s) algorithm is not returning optimal results or is not considering other relevant input variables. A modification to the existing algorithm may either be determined programmatically (self-determined) or manually by a human. The new replacement code may be generated for modifying the algorithm. The replacement code may be applied to the relevant middleware device memory by an agent/application. The change to the algorithm or an encrypted value corresponding to the change may be stored in a ledger-chain mechanism, such as a blockchain. Next, the new algorithm may be evaluated using the same metrics that triggered the change to the original algorithm. If the change is deemed acceptable, it may remain in the device's memory. If the change is determined to produce unacceptable results, it may simply be removed from the device's memory; the old algorithm may be restored and the blockchain may be updated. Thus, in this example, the feedback mechanism to trigger an algorithm change may be autonomous and managed using ledger-chaining. By automating the distribution and management of algorithms run by middleware devices, the present disclosure may advantageously reduce the overhead associated with large distributed systems and may advantageously make the results more correct and less stale. Algorithm changes may be applied at the object code level instead of the full application binary image. This alleviates the requirement to perform a recompilation of the full application binary image and allows the algorithm updates to be performed without having to restart the device or the specific system software component after the image in memory has been updated. It may also advantageously allow for the tweak to be removed without disruption to the system, if necessary.

Certain examples of the present disclosure relate to distributed information handling systems and methods for automatic object code replacement and patching. As an example, devices at the edge of a cloud-based computing system may have code running in their memories to enable distributed compute. Object level versions of the code may require modification over time. Similarly, viruses, malicious code, or malware running in such devices may need to be isolated. Certain solutions may require updating of the executable binary images. Certain examples in this disclosure relate to applying code changes at an object code level. Example object code files may include relocatable format machine code that may not be directly executable. Object level code may be produced using an assembler, a compiler, or some other translator, and may be used as input to a linker or another tool. A linker or a similar tool may be used to generate an executable code file or a library of code files by combining various object code files or parts of object code files. In certain examples, object code files may include metadata information, including, for example, information to resolve cross-references (e.g., symbolic cross-references) among different modules, relocation information, information for unwinding stacks, monitoring, profiling, or debugging information, and comments.

In one example, a mechanism prepares and applies algorithm changes at the object code level instead of the full application binary image. This may advantageously allow the algorithm update to be performed without having to restart the device or the specific system software component after the image in memory has been updated. It also may advantageously allow for the tweak to be removed without disruption to the system, if necessary. In one implementation, changing compiler optimization options to generate object code that places each function and data item in its own section allows one to lay out an entire object file's executable text within a single section named ".text". This format of object file may contain all the necessary metadata to resolve symbolic cross-references between different modules, relocation information, stack unwinding information, comments, program symbols, debugging or profiling information. The structure of the aforementioned object files, which provide all necessary information for an "update in memory," allow the tweaking of a data analysis algorithm in memory to occur when semantic changes have not been made to the existing software's persistent data structures. This situation can occur when there is a new environmental factor that needs to be considered for usage in real time data analytics or a need for altered behavior but does not require a change in the persistent data structures of the software.

According to one example, the update process of replacing an object by linking to a new version of the object, e.g., the replacement code, into the algorithm in memory, occurs by placing a new CALL instruction in the running software's memory, at the start of the obsolete function, to direct execution to the replacement code. To generate replacement code, a code handler or an updater may identify the changes compared to the new algorithm and generate code for the differences. First, algorithm builds may be performed with compiler options enabled to ensure that every C function and data structure within the software receives its own section within the resulting object files. Enabling these options may force the compiler to generate relocations for functions and data structures, which results in more generic code that does not make assumptions about where functions and data structures are located in memory. When compiling with these options, the functions that have not been changed directly by the updated code will often have identical existing and updated software object code. Next, the differences between the existing algorithm and the updated algorithm may be calculated. This will identify which sections of object code need to be replaced in memory. This calculation may be performed by an agent or a code handler running in the cloud/gateway. In one example, during an update, a safe time to perform an update of an individual object would be when no thread's instruction pointer falls within that object's ".text" in memory and when no thread's kernel stack contains a return address within that function's ".text" in memory. If these safety conditions are not initially satisfied, then a retry may be attempted after a short delay. If multiple attempts are unsuccessful, then in one example, the code handler may abandon the algorithm patch attempt and report that a reboot of the device or an application restart is required to perform the full update.

Furthermore, in certain examples message passing among devices may be used to accomplish the object code level changes. Message passing may be implemented using various techniques, including ledger-chained based techniques, such as blockchains and sidechains. In one example, the sidechain mechanism may be used to handle message passing. Sidechaining may include exchanging tokens between separate block chains. Blockchains may be used to keep track of any modifications or updates to the object level code in the memory of the devices at the edge of the cloud.

FIG. 1 is a block diagram of a ledger-chained distributed information handling system (LCDIHS) 100 in accordance with one example. LCDIHS 100 may include a cloud compute network 110 coupled to a gateway 140 which further may be coupled to a sensor network 170. Cloud compute network 110 may include various types of devices, sensors, controllers, and host or centralized nodes. These devices, sensors, controllers, and nodes may be interconnected using a network such as a wired network, a wireless network, or a combination of these. The network may also be a private network, such as a private cloud-computing network. The network may be implemented using Ethernet, FDDI, or other types of networking technologies. Communication among the various components may occur using unicast transmissions, broadcast transmissions, or multicast transmissions. Ethernet Layer 2 and/or Layer 3 functionality may be used to enable multicast transmissions and broadcast transmissions. Broadcast and multicast operations may be implemented based on User Datagram Protocol (UDP) in a TCP/IP based system. Unicast operations may be implemented based on Transport Control Module (TCP) in a TCP/IP based system.

With continued referenced to FIG. 1, as an example, cloud compute network 110 may include augmented sensor 122, augmented sensor 124, and augmented sensor 126. Compute cloud network 110 may further include a virtual master arbiter 112 and another virtual master arbiter 114. Compute cloud network 110 may further include a centralized node 130. Augmented sensors, for example augmented sensor 122, may receive sensor inputs such as sensor input 116, sensor input 118, or sensor input 120. In general, any of the augmented sensors may receive any of the sensor inputs in any combination based on the configuration of these sensors and the sensor inputs and coupling of the sensor inputs to the respective augmented sensors. Each augmented sensor may be implemented as a device that has at least a processor, a memory, and code stored in the memory where the code may relate to at least one algorithm that could be used to process the sensor inputs, for example, to generate some results. Each virtual master arbiter may provide control features with respect to the augmented sensors as described more in detail later. Centralized node 130 may refer to a host that may provide at least one service to a distributed information handling system such as LCDIHS 100. Such services may include a compute service, a storage service, or a networking service. Like cloud compute network 110, gateway 140 may include augmented sensor 146, augmented sensor 148, and augmented sensor 150. Each of the augmented sensors may perform similar analysis or operations on sensor input, for example sensor input 152. As shown in FIG. 1, sensor input may arise not only from external to gateway 140, but also from within gateway 140. As an example, sensor input 144 may relate to sensor data obtained from within the gateway. Sensor network 170 may similarly include augmented sensor 174. Sensor network 170 may further include the virtual master arbiter 172, and a centralized node 180. Sensor network 170 may further include the ability to receive sensor inputs, for example sensor input 176 and sensor input 178. Each one of the networks including cloud compute network 110, gateway 140, and sensor network 170 may include different combinations of augmented sensors, virtual master arbiters, and/or centralized nodes or other types of systems and devices, as needed. In each one of these networks, an augmented sensor may be a device that may provide the functionality of a sensor or may not. As an example, an augmented sensor may simply be a device that analyzes or processes inputs required by other sensors and does not perform any sensing operations. Instead, using certain algorithms, an augmented sensor may simply perform analytics on sensor inputs received via other sensors. Although FIG. 1 shows a certain number of components of LCDIHS 100 arranged in a certain manner, there could be more or fewer number of components arranged differently. As an example, LCDIHS 100 may include other networks, gateways, cloud/sensor networks and several other types of networks, including storage networks. As an example, there could be several hosts, devices, augmented sensors, and/or virtual master arbiters (and related controllers) as part of LCDIHS 100. In one example, there may be L hosts, M devices or augmented sensors, and O controllers, where each of L, M, and O is a positive integer.

Figure 2:
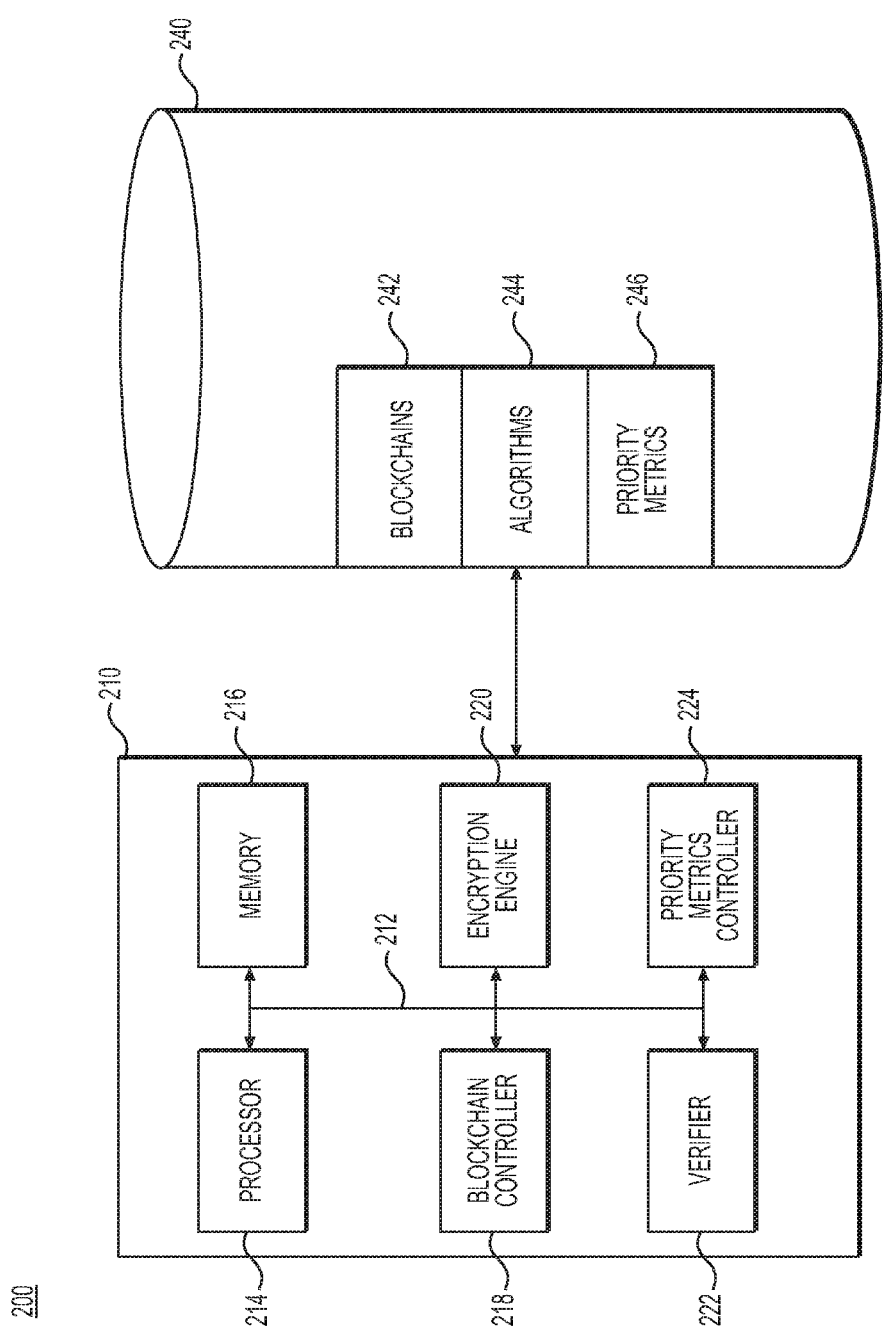
FIG. 2 is a block diagram of a controller for a ledger-chained distributed information handling system in accordance with one example.

FIG. 2 is a block diagram of a virtual master arbiter 200 for a ledger-chained distributed information handling system 100 of FIG. 1 in accordance with one example. Virtual master arbiter 200 may include a controller 210 coupled to a database 240. Controller 210 may include a processor 214, a memory 216, a blockchain controller 218, an encryption engine 220, a verifier 222, and a priority metrics controller 224, each of which may be coupled to each other via at least one bus 212. Processor 214 may execute any algorithms or programs or code stored in memory 216 to enable at least some of the functionality associated with controller 210. In one example, blockchain controller 218 may be configured to manage blockchain 242 stored in database 240. Encryption engine 220 may be configured to create encrypted values or hash values corresponding to information processed by augmented sensors; for example, algorithms, transactions, or results. Encrypted values may be stored as part of blockchains 242. Verifier 222 may be configured to verify the blockchains or portions of the blockchains to determine whether a blockchain meets at least one condition before the blockchain is stored in database 240. Verifier 222 may perform operations, such as encryption or hash operations to convert any transactions related to updated algorithms into a string of digits, e.g., a hash value. Priority metrics controller 224 may allow a user or an administrator of the LCDIHS 100 to provide user specified criteria that may be used to modify the relative significance or priority of various inputs to an algorithm. In one example, priority metrics controller 224 may provide user specified information that may be stored in database 240 as priority metrics 246. Priority metrics controller 224 may access priority metrics 246 and process the information stored in priority metrics 246 to determine whether certain user specified criteria is met by an algorithm that is processing certain inputs to generate results.

With continued reference to FIG. 2, blockchain(s) may be replicated on tens or hundreds of virtual master arbiters. As described later, the blockchain(s) may be updated only when the relevant virtual master arbiters agree with each other through a consensus mechanism to update the blockchain in view of the various modifications to any of the algorithms. Although FIG. 2 shows a certain number of components of virtual master arbiter 200 arranged in a certain manner virtual master arbiter 200 may include additional or fewer components arranged differently. As an example, although FIG. 2 shows virtual master arbiter 200 as including a controller 210 and a database 240, the functionality associated with controller 210 and database 240 may be distributed or disaggregated in different ways. In addition, although FIG. 2 shows a certain number of components of controller 210 arranged in a certain manner there could be more or fewer components arranged differently. Similarly, although FIG. 2 shows a certain number of database tables stored in a database 240, there could be more or fewer number of database tables arranged differently. Additionally, the tables and/or other types of data structures stored in database 240 may be distributed or disaggregated in other types of databases or distributed databases.

Figure 3:
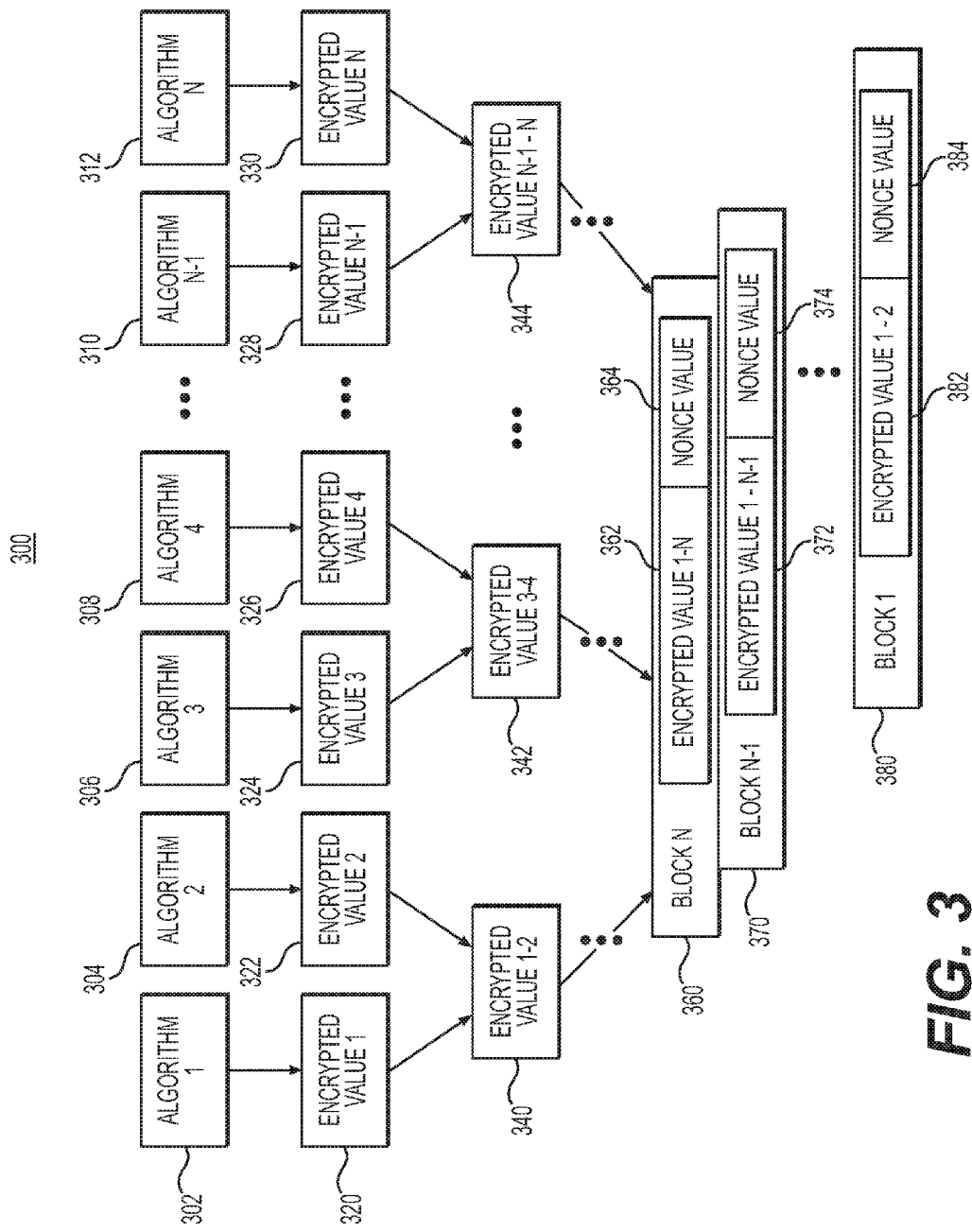
FIG. 3 is a diagram illustrating a portion of a ledger-chained distributed information handling system in accordance with one example.

FIG. 3 is a diagram illustrating a portion of a ledger-chained distributed information handling system 100 in accordance with one example. As shown in FIG. 3, a ledger-chained mechanism may be used to distribute and manage changes to the various algorithms that may be stored on different middleware devices, including, for example, the various augmented sensors in cloud compute network 110, gateway 140, or sensor network 170. In this example, the ledger-chained mechanism is explained in relation to a blockchain based system. Algorithms 1-N (algorithm 1 302, algorithm 2 304, algorithm 3 306, algorithm 4 308, algorithm N-1 310, and algorithm N 312) may be processed by the ledger-chained mechanism to allow the distribution and management of updates to such algorithms in a distributed and a decentralized manner. In this example, prior to storage as part of the ledger, each one of the algorithms or a modification to an algorithm may be subjected to an encryption operation by using, for example, encryption engine 220 of FIG. 2, to generate a corresponding encrypted value. As an example, encrypted value 1 320 and encrypted value 2 322 may be generated that may correspond to algorithm 1 302 and algorithm 2 304, respectively. In one example, each encrypted value may be a hash value of a fixed length that may be obtained by applying a cryptographic or hash operation to any transactions relating to modifications to algorithms. Similarly, encrypted value 3 324 and encrypted value 4 326 may be generated that may correspond to algorithm 3 306 and algorithm 4 308, respectively. Additionally, encrypted value N−1 328 and encrypted value N 330 may be generated and those may correspond to algorithm N−1 310 and algorithm N 312, respectively. Next the encrypted values may be combined in a tree fashion, for example, by using a Merkle tree. Thus, encrypted value 1 320 and encrypted value 2 322 may be combined into encrypted value 1-2 340. Encrypted value 3 324 and encrypted value 4 326 may be combined into encrypted value 3-4 342. Similarly, encrypted value N−1 328 and encrypted value N 330 may be combined into encrypted value N−1−N 344. The combined encrypted values along with additional information may be stored in blocs corresponding to a blockchain. Blocks corresponding to a blockchain may be stored as part of blockchains 242 in database 240 of FIG. 2. Example block N 360, block N−1 370, and block 1 380 may be stored in blockchain(s) 242 in database 240. Each one of the blocks may include at least one ledger entry. Each ledger entry may include a header, which may include a hash value (e.g., an encrypted value) corresponding to each of the relevant transactions for the algorithms. Each of the blocks may further include nonce values or some other type of code to allow the blockchain controller, for example blockchain controller 218 of FIG. 2, to add additional information to the encrypted values for the respective algorithms. Example block N 360 may include encrypted value 1-N 362 and nonce value 364. Example block N−1 370 may include encrypted value 1-N−1 372 and nonce value 374. Example block 1 380 may include encrypted value 1-2 382 and nonce value 382. Each virtual master arbiter 200 may (by using verifier 222, for example) perform mathematical calculations to solve the cryptographic puzzle created by concatenating headers including hash values. Once a verifier comes up with a solution to the cryptographic puzzle, other verifiers in the LCDIHS 100 may confirm the validity of the solution. Without the solution to this puzzle, no blockchain header may be updated. In this example, to ensure the integrity of the system, virtual master arbiters may be required to be trusted controllers. Although FIG. 3 shows a certain way of processing information related to the algorithms to enable distributed updates and management of the algorithms, this information could be processed differently. As an example, the encrypted values may be combined differently.

Figure 4:
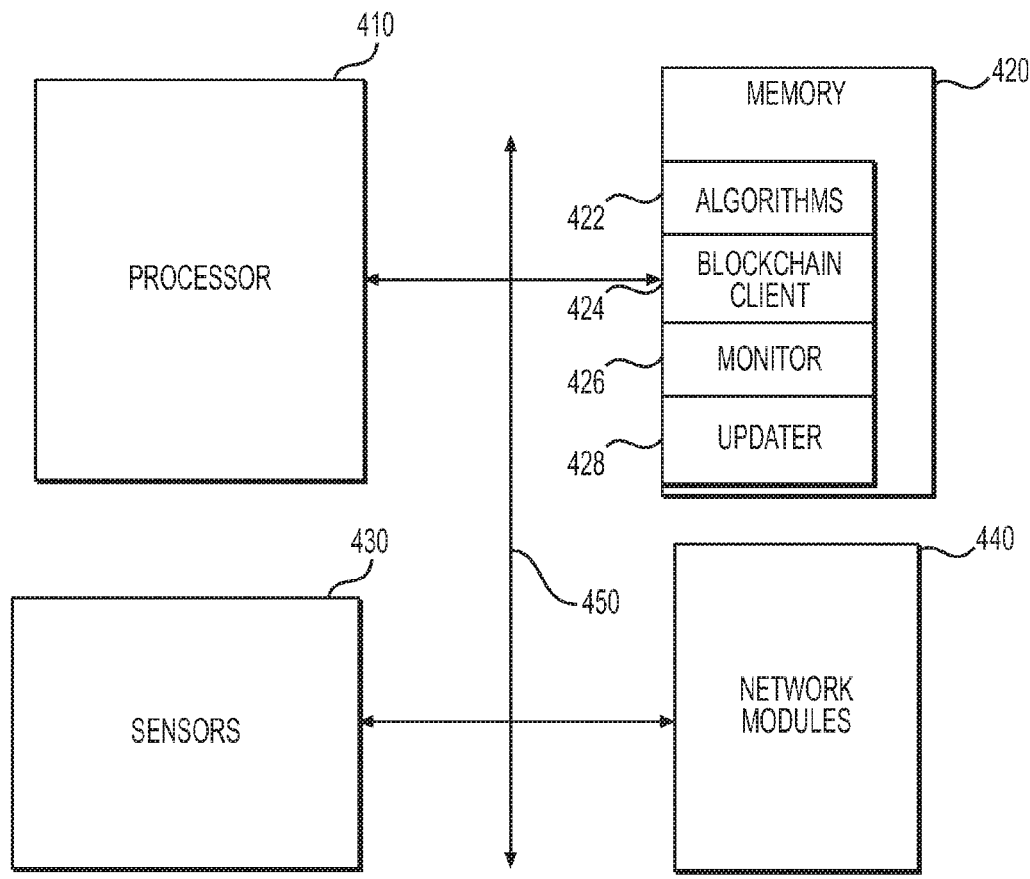
FIG. 4 is a diagram illustrating a device for use in a distributed information handling system in accordance with one example.

FIG. 4 is a diagram illustrating a device 400 for use in a ledger-chained distributed information handling system in accordance with one example. Device 400 may be configured as an augmented sensor or a different type of device to process certain inputs; for example, sensor inputs. In one example, device 400 may process the inputs to generate at least one result and the processing may be based on at least one algorithm. Device 400 may include a processor 410, a memory 420, sensors 430, and network modules 440. Each one of these components may be coupled using bus 450. Processor 410 may execute code corresponding to algorithms, an operating system, or other types of software. Processor 410 may be implemented using an off-the-shelf processor or using one or more Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). Memory 420 may include algorithms 422, a blockchain client 424, a monitor 426, and an updater 428. Memory 420 may be a combination of a volatile memory, such as DRAM, and a non-volatile memory, such as flash memory. Algorithms 422, stored in memory 420, may include at least one algorithm that may be executed or processed by processor 410. As an example, by executing any algorithms stored in memory 420, processor 410 may process various sensor inputs to provide at least one result. Blockchain client 424 may provide the functionality associated with the ability for device 400 to access blockchain controller 218 of FIG. 2 via an application program interface (API). Monitor 426 may provide the functionality associated with device 400 being able to detect any changes to any algorithms that device 400 may be processing. Updater 428 may provide the functionality associated with performing any updates needed for the algorithms, for example algorithms 422, that are being processed by device 400. Although not shown, each one of the various executable components stored in memory 420 may interact with an operating system that may be stored in memory 420 as well. Such interaction may occur via standard application program interfaces (APIs) or a custom API designed to allow the various components in memory 420 to exchange information and execute commands using the API. Sensors 430 may include different types of sensors. Sensors 430 may include various types of sensors for sensing physical conditions, chemical conditions, environmental conditions, network conditions or network performance, storage conditions or storage performance, compute conditions or compute performance, and other such sensors, including telemetry sensors. Network modules 440 may provide the functionality to device 400 of communicating with other components in the ledger-chained distributed information handling system. Network modules 440 may include network controllers for interfacing with various wired or wireless protocols, such as Wi-Fi, Ethernet, Bluetooth, or other such protocols. Although FIG. 4 shows a certain number of components of device 400 arranged in a certain manner device 400 may include additional or fewer components arranged differently. In addition, each device 400 may have a unique global identifier that may be used to track the devices. The global identifier may also be used to index information concerning the devices in any of the databases described with respect to FIG. 2.

Figure 5:
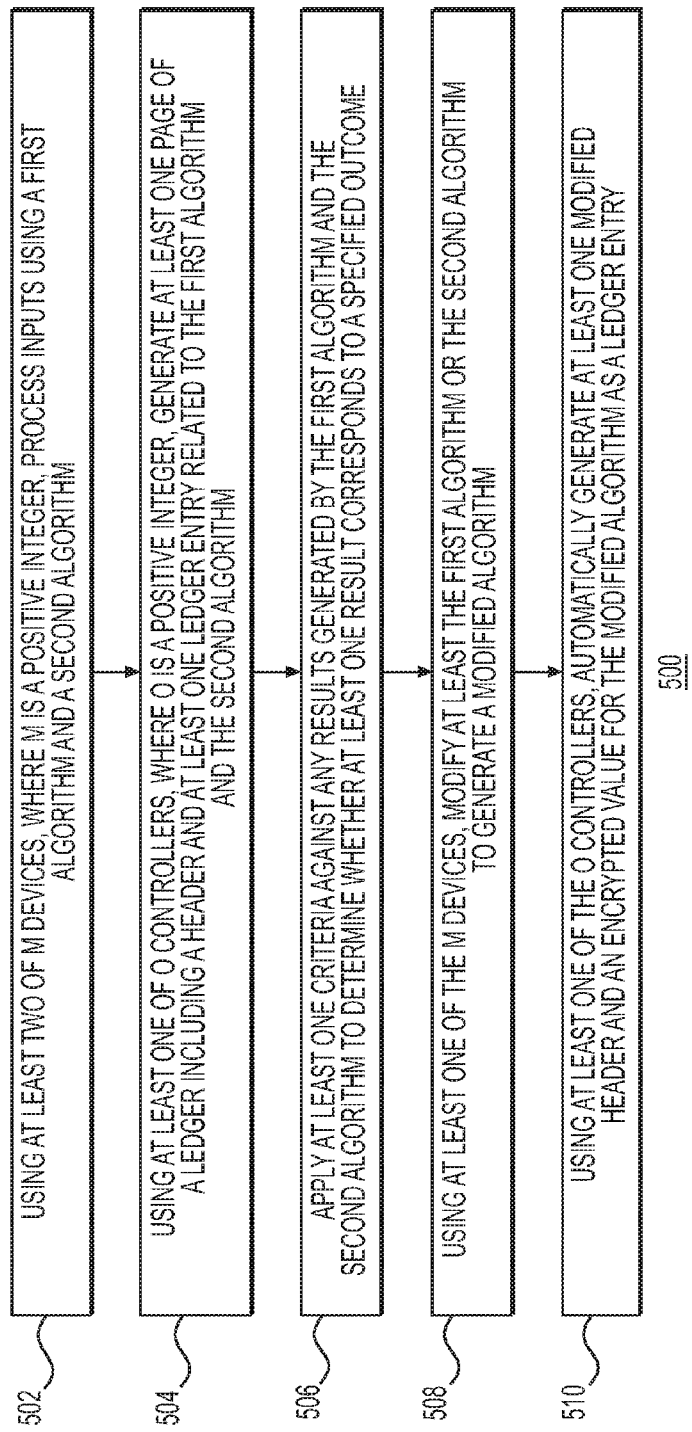
FIG. 5 is a diagram illustrating a method in a ledger-chained distributed information handling system in accordance with another example.

FIG. 5 is a diagram illustrating a flowchart 500 of a method in a ledger-chained distributed information handling system in accordance with an example. In this example the method may be used with LCDIHS 100 described with respect to FIG. 1. In step 502, using at least two out of M devices (e.g., device 200 of FIG. 2), where M is a positive integer, one may process inputs (e.g., sensor inputs) using a first algorithm and/or a second algorithm. In this example the first algorithm may be the algorithm that was initially stored in the memory of a device. The second algorithm may be an algorithm that is going to replace the first algorithm. The second algorithm may also be an algorithm that is simply a modification of the first algorithm in that the second algorithm processes at least one different input from the first algorithm or it has at least one process, function, or code snippet that is different from the first algorithm. In step 504, using at least one of O controllers, where O is a positive integer, a controller corresponding to a virtual master arbiter 200 (e.g., controller 210 of FIG. 2) may generate at least one page of a ledger, including a header, and at least one ledger entry related to the first algorithm and/or the second algorithm. As part of this step, the virtual master arbiter may process the first algorithm or the second algorithm, transactions related to these algorithms, variables related to these algorithms, or inputs and/or outputs related to these algorithms. In this example, the page header may include an encrypted or hash value corresponding to the at least first algorithm or the second algorithm. The remaining part of the ledger entry may include a nonce value that may be added to the encrypted value as shown in, for example, FIG. 3.

In step 506, a controller corresponding to a virtual master arbiter (e.g., controller 210 of FIG. 2) may apply at least one criteria against any results generated by the first algorithm and/or the second algorithm to determine whether the at least one result corresponds to a specified outcome. As part of this step processor 214 and priority metrics controller 224 may cooperate with each other to evaluate priority metrics 246 stored in database 240 to determine, in real-time, whether a user specified criteria is satisfied by any of the results generated by either the first algorithm or the second algorithm. In this manner, a user, another system operator, or another entity, including even an automated piece of code may modify at least some part of the criteria stored as part of priority metrics 246 at any time in a distributed manner. At any time, a virtual master arbiter may process the priority metrics, for example using processor 214 and priority metrics controller 224, and that processing may result in determining whether the user specified criteria is being satisfied based on a particular outcome that the user may have required from an algorithm. The user specified criteria may provide a ranking or rating system to evaluate whether a particular outcome is satisfactory.

In step 508, using at least one of the M devices, the first algorithm or the second algorithm may be modified to generate a modified algorithm. As part of this step, a device (e.g., device 400 of FIG. 4) may modify the first algorithm or the second algorithm stored in the memory of the device to generate a modified algorithm. The modification of the algorithm may be made only if the at least one criteria when applied to the results corresponds to a specified outcome. In step 510, using at least one of the O controllers, one may automatically generate at least one modified header and an encrypted value for the modified algorithm as a ledger entry. This step may relate to generating a modified header which may be a one-way hash derived from the algorithm that has been modified or it may be an encrypted value for some other aspects of the modified algorithm. Although FIG. 5 shows the steps of method 500 being performed in a certain order, these steps may be performed in a different order and other steps may be added.

Figure 6:
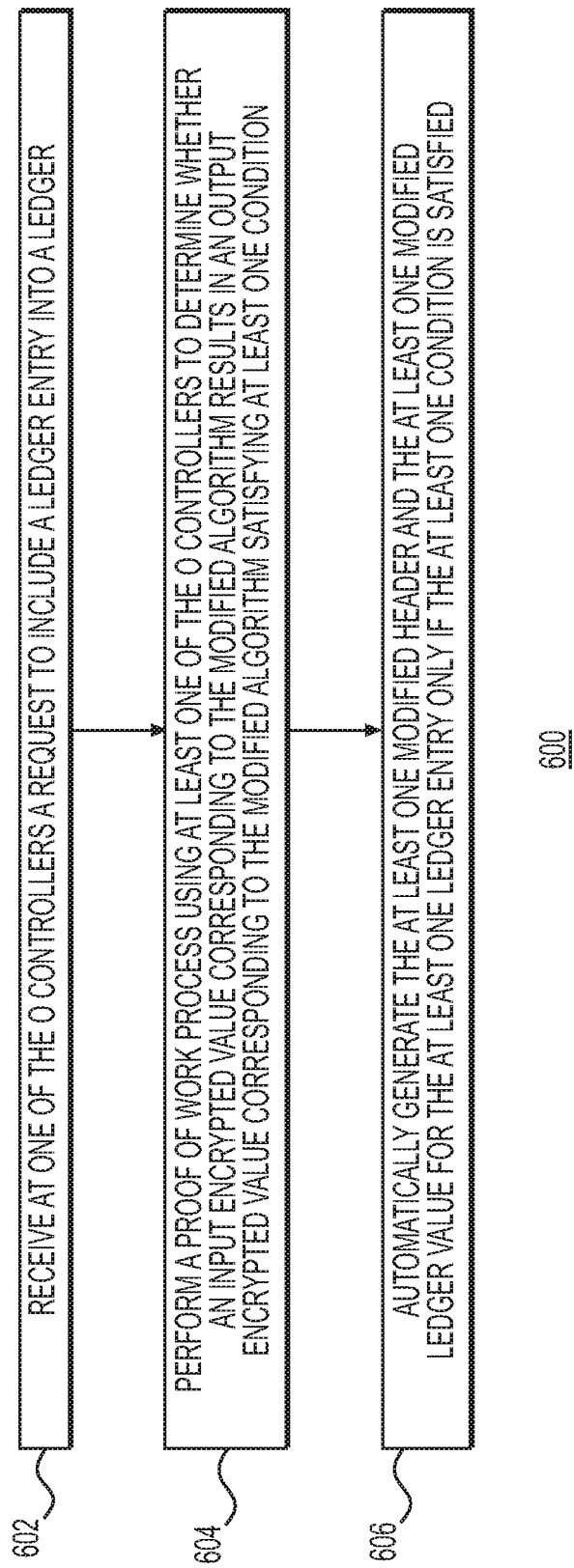
FIG. 6 is a diagram illustrating a method in a ledger-chained distributed information handling system.

FIG. 6 is a diagram illustrating a method in a ledger-chained distributed information handling system in accordance with another example. In step 602, any one of the O controllers (e.g., virtual master arbiters 200) may receive a request to include a ledger entry into a ledger, such as blockchain(s) described earlier. This request may be generated in response to a modification to an algorithm by blockchain client 424 of FIG. 4. In step 604, at least one of the virtual master arbiters may perform a proof of work process to determine whether an input encrypted value corresponding to the modified algorithm results in an output encrypted value corresponding to the modified algorithm satisfying at least one condition. As described earlier, this process may include solving a cryptographic puzzle associated with a blockchain to find at least one solution. In this example, verifier 222 of FIG. 2 may modify the nonce value included as part of the blockchain being validated to determine the at least one solution. In step 606, blockchain controller 218 may automatically generate a new header and a modified ledger value (e.g., algorithm value) to at least one ledger entry (e.g., a block or a portion of a bock of a blockchain) only if the at least one condition is satisfied. Thus, once the solution to the cryptographic puzzle has been found by at least one blockchain controller then the other controllers may confirm the solution. In one example, a local copy or a portion of the blockchain may not be updated unless at least a pre-determined number of trusted blockchain controllers have confirmed the solution. Although FIG. 6 shows the steps of method 600 being performed in a certain order, these steps may be performed in a different order and other steps may be added.

Figure 7:
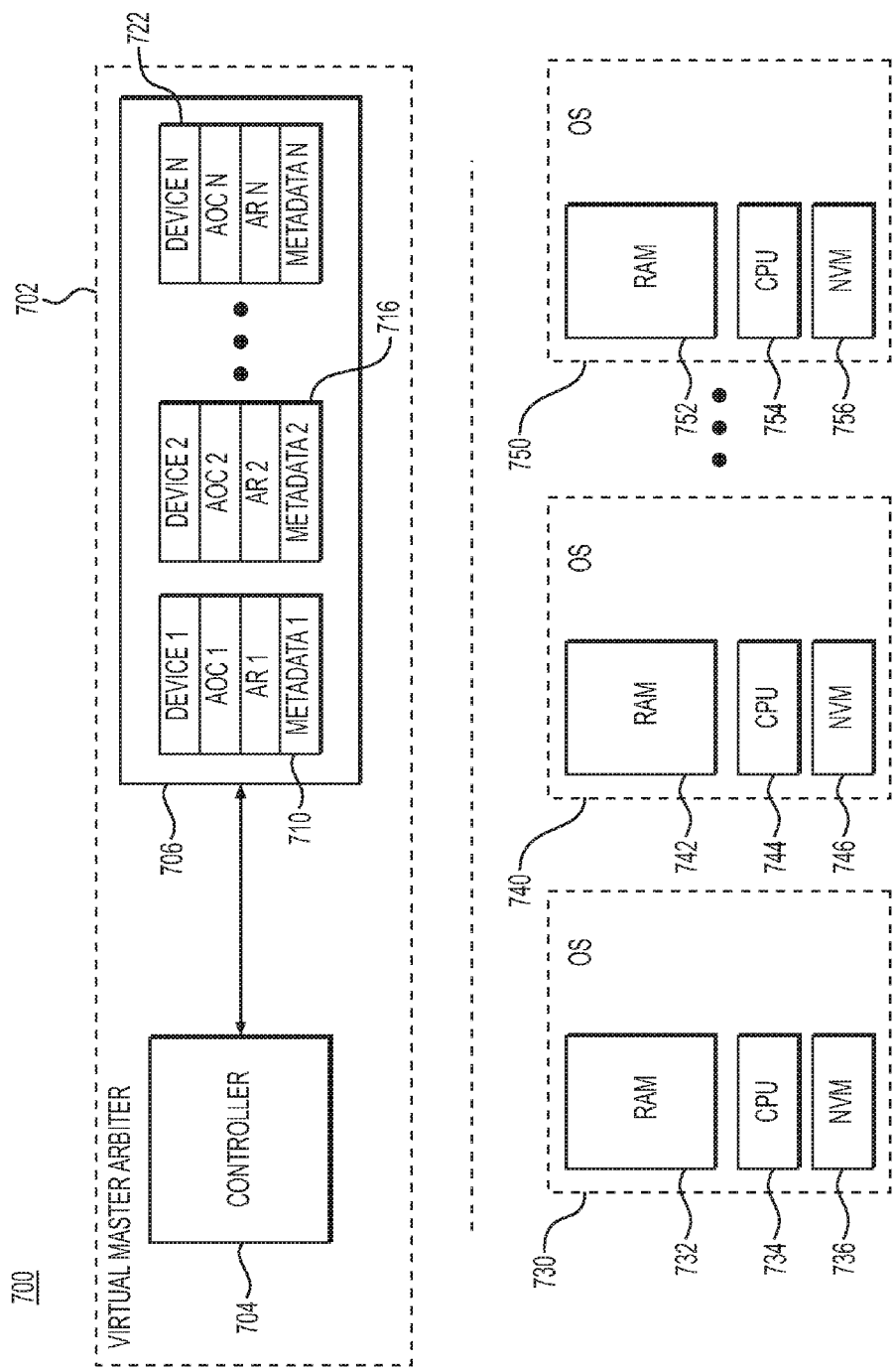
FIG. 7 is a diagram of a distributed information handling system for automatic object code replacement and patching in accordance with one example.

FIG. 7 is a diagram of a distributed information handling system (DIHS) 700 for automatic object code replacement and patching in accordance with one example. DIHS 700 may include a virtual master arbiter 702 and devices 730, 740, and 750 that may communicate with virtual master arbiter 702. Virtual master arbiter 702 may include a controller 704 and a database 706. Additional details regarding the virtual master arbiter are provided with respect to FIG. 2. In particular, FIG. 2 describes the components of controller 704 with reference to controller 210 and the components of database 702 with respect to database 240 of FIG. 2. Database 706 may include tables corresponding to the various devices associated with virtual master arbiter 702. Each one of these tables may include information that may be pertinent to virtual master arbiter 702 being able to provide functionality associated with object code replacement and object code modification. As an example, table 710 for device 1 may include object code for an algorithm; for example, algorithm object code 1 (AOC 1). Table 710 may further include information concerning available resources for device 1 (AR 1). In addition, Table 710 may include metadata corresponding to device 1 and the information that device 1 is collecting or processing (METADATA 1). Similarly, Table 716 may include information concerning device 2 including object code for algorithm 2 (AOC 2). It may further include available resources for device 2 (AR 2). It may further include metadata or information concerning the type of information that's being processed or collected by any algorithms that are being used or run on device 2 (METADATA 2). Similarly, Table 722 may include the relevant information concerning device N. For example, it may include information such as AOC N, AR N, and METADATA N. Each one of these fields or rows of information may be similar to other devices and tables concerning those devices. Devices 730, 740, and 750 may include various components similar to device 400 described with respect to FIG. 4. As an example, device 730 may include an operating system (OS), RAM 732, CPU 734, and non-volatile memory (NVM) 736. Similarly, device 740 may include an operating system (OS), RAM 742, CPU 744, and NVM 746. Device 750 may include an operating system (OS), RAM 752, CPU 754, and NVM 756. Each algorithm may execute processes that may include corresponding memory space in the memory (e.g., RAM) of the relevant devices. As an example, the memory space corresponding to each process may be organized (e.g., segmented) as shown in Table 1 below.

TABLE 1

| Address | Segments |
|---|---|
| High Address | Command line arguments and environment variables |
| | Stack |
| | Unused memory |
| | Heap |
| | Uninitialized Data Segment |
| | Initialized Data Segment |
| Low Address | Text Segment |

As shown in example Table 1, the memory space corresponding to a process may be segmented from a Low Address to a High Address. Text Segment may include executable code that may be shared among various instances of an algorithm. Initialized Data Segment may include global variables that may have been initialized by a programmer or another entity. Uninitialized Data Segment may include uninitialized global variables. Heap may refer to the memory space that may be dynamically allocated to a process. Unused memory may refer to memory space that is not being currently used by a process. Stack may be a collection of stack frames that may allow management of new functions and calls. Frames may have a variable size and may have a designated frame number referred to by a frame pointer. Each frame may correspond to a process, such as main( ), function_1( ), function_2( ), and so on. Each frame may further include a stack pointer that may be used within the frame to enable offset addressing. In one example, the offset for the Low Address may always start at address 0x0. Although Table 1 shows certain segments organized in a certain manner, memory space corresponding to the process may include additional or fewer segments organized differently.

In this example, the object code corresponding to the various algorithms that are being executed or used by a particular device in a certain point in time may be stored in a random-access memory (RAM). As an example, algorithm 1 may be loaded into the RAM corresponding to device 1 and it may execute and collect data or perform other processing at certain intervals. Next, as discussed earlier with respect to FIGS. 1-6, the encrypted value corresponding to the algorithm may be stored as part of a ledger-based system or a blockchain based system. In this example, at certain pre-determined frequency data collected and processed, including results or outputs, may be provided to the virtual master arbiter or some other higher tier at a pre-determined frequency. Virtual master arbiter 702 may determine potential algorithm changes in response to certain user specified criteria or other automatic processes that may be put into place to improve the performance of the data collection and processing in the DINS 700. Virtual master arbiter 702 may be responsible for replacing object code when it needs replacement and generating new object code and providing that as replacement code to the devices. As an example, replacement code or a patch modifying the object code corresponding to an algorithm that needs modification may be transmitted by virtual master arbiter 702 to device 1, device 2, or device N. As described further with respect to FIG. 8, a handler that may be stored as part of the operating system or some other code associated with each of the devices may perform the patching, including the modification of the code or the replacement of the code in the devices. In this example, the code that is stored and is considered old may be bypassed while new code that may be replacement or modified code may be executed.

Figure 8:
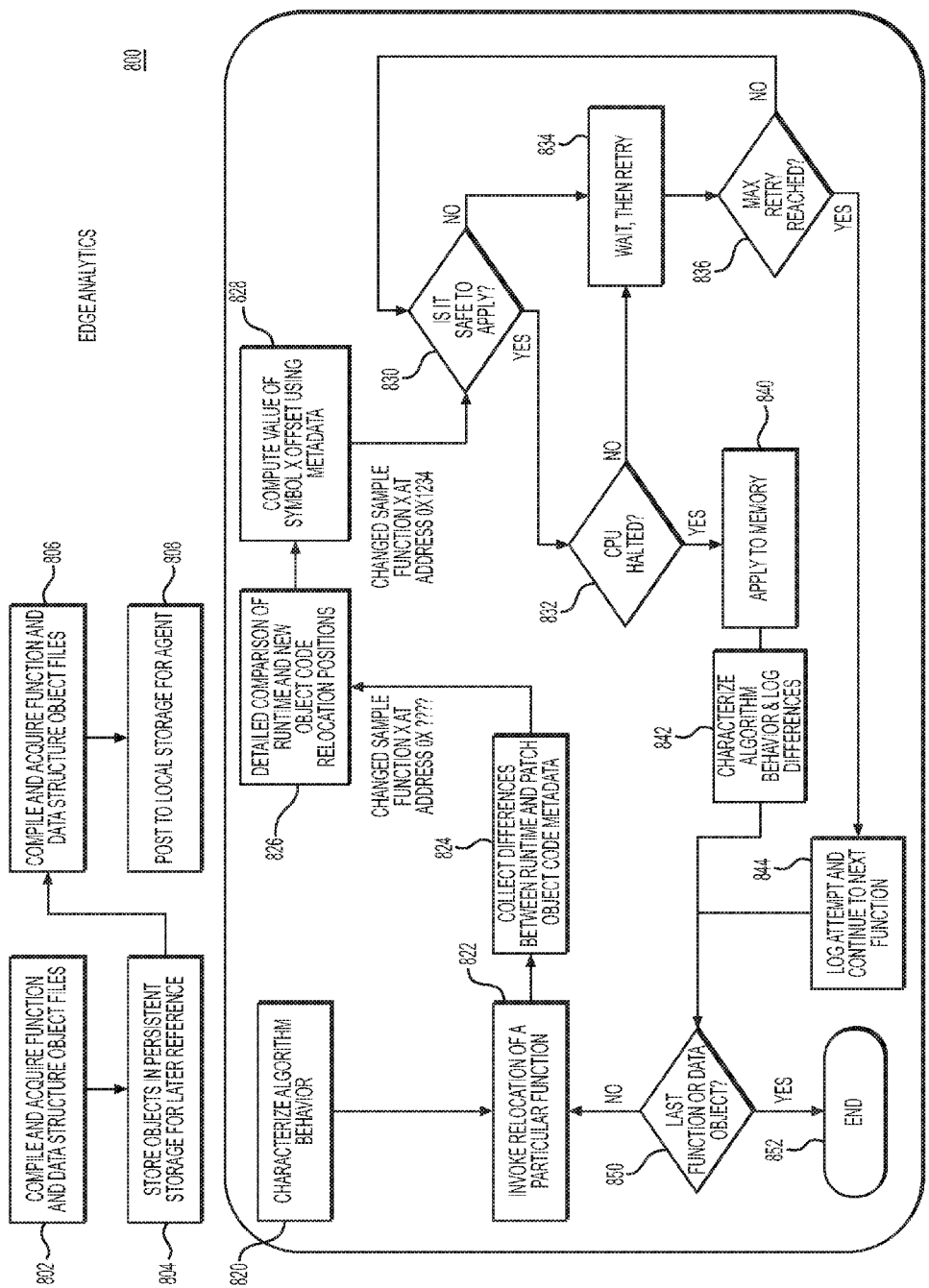
FIG. 8 is a diagram of a method for automatic object code replacement and patching in accordance with one example.

FIG. 8 is a diagram of a flowchart 800 of a method for automatic object code replacement and patching in accordance with one example. In step 802, the function and data structure object files may be compiled and acquired. As an example, Table 2 below shows source code corresponding to an algorithm (hello program) that may be used to print a character string, such as "hi world."

TABLE 2

| | |
|---|---|
| 1 | #include <stdio.h> |
| 2 | #include <stdlib.h> |
| 3 | #include "PrintItem.h" |
| 4 | |
| 5 | int main(void) |
| 6 | { |
| 7 | int m; |
| 8 | int x = 0; |
| 9 | char whatToPrint[15]; |
| 10 | char *address = whatToPrint; |
| 11 | |
| 12 | for(m=0;m<20;m++) { |
| 13 | getPrintItem(address); |
| 14 | printf ("%s\n", whatToPrint) |
| 15 | ; |
| 16 | sleep (15); |
| | } |

The object code corresponding to the same algorithm may initially include a stack frame belonging to the main( ) function of Table 2. In this example, the object code may start with a stack pointer that points to a relative address of zero in a memory. Subsequent lines of code may be referenced using an offset from the stack pointer. The object code may be generated using an assembler, a compiler, or some other translator. In this example, the object code starting from line 12 from the main( ) function, which is just before the call to function getPrintItem(address) is made, as shown in Table 2, may take the form shown in Table 3 below.

TABLE 3

| Absolute Memory Address | Function + Offset | Opcode | Assembly |
|---|---|---|---|
| main ( ) at hello.c:12 | | | |
| 12 | for(m=0;m<20;m++) { | | |
| (gdb) x/101 $pc - 6 | | | |
| 0x8048417 | <main+67>: | add | %ch,%al |
| 0x8048419 | <main+69>: | mov | $0xfe,%bh |
| 0x804841b | <main+71>: | (bad) | |
| 0x804841c | <main+72>: | incl | -0x7cfe0fbb(%ebx) |
| 0x8048422 | <main+78>: | jge | 0x8048414 <main+64> |
| 0x8048424 | <main+80>: | adc | -0x2c(%esi), %edi |
| 0x8048427 | <main+83>: | cmpl | $0x1, -0xc(%ebp) |
| 0x804842b | <main+87>: | jne | 0x8048462 <main+142> |
| 0x804842d | <main+89>: | movl | $0x0, -0x10($ebp) |
| 0x8048434 | <main+96>: | jmp | 0x804845c <main+136> |

Depending on the implementation, in one example, step 802 may be performed by a code handler that may be part of the operating system for a particular device or an augmented sensor.

In step 804, the object code may be stored in a persistent storage, for example NVM, as discussed with regards to FIG. 7. This step may be performed using a code handler that may be part of the operating system for a device. In step 806, if needed, the data structure object files and function may be compiled and acquired at a later time. In step 808, the compiled object code may be posted to a local storage. As an example, a code handler may post the object code to RAM associated with a particular device.

With continued reference to FIG. 8, DINS 700 may include various devices with algorithms being performed or used. As discussed earlier, over time some of these algorithms may become outdated or otherwise produce suboptimal results. As an example, as described with respect to FIGS. 1-6, algorithms may require modification or replacement over time. This process may include evaluating the results, inputs, or outputs associated with an algorithm against a user specified outcome to determine whether modification or replacement of the algorithm is needed. In step 820, the algorithm behavior may be characterized. As part of this step, in one example, real time data may be fed back from one or many nodes/gateways/clouds that indicate that a device's algorithm may not be returning optimal results or is not considering other input variables. In this example, modification to the existing algorithm is either determined programmatically (automatically-determined) or manually by a human. If this step points to a modification or replacement of the object code corresponding to the algorithm, then step 822 may include invoking relocation of a particular function associated with the algorithm. Step 824 may include collecting differences between metadata for the runtime code and the patch object code.

As an example, the "hello program," whose source code, as shown in Table 1, includes the function getPrintItem( ) that may need modification or replacement such that the new function may be getPrintItem2( ). In step 826, virtual master arbiter or a person may make a detailed comparison between the runtime object code and the relocation positions for the new object code. When a call to function getPrintItem( ) is made, unused stack memory may be used to create a frame for the function getPrintItem( ). In this example, the stack memory may hold storage space for a character pointer and the line to return to within the function main( ). After the call to function getPrintItem( ) returns, the stack memory consumed by that function may be available for other uses. Thus, in the source code corresponding to a program, such as hello world, code may contain references to other functions and storage of data. In the object file, such references may be converted to instructions and relocation pairs, as the compiler may not be able to tell in advance where the code will end up. In the "hello program" example, the object code may be represented as in Table 4 below:

TABLE 4

```
401000: 6A  20              push   20h       // function argument
        E8  09  00  00  00  call   401010
        83  C4  04          add    esp, 4    // stack restore after c-style call
        33  C0              xor    eax, eax  // clear register
        C3                  ret              // c-style return from procedure
401010: 51                  push   ecx       // adjust stack for local variables
        53                  push   ebx       //
        8B  5C  24  0C      mov    ebx,dword,ptr[esp_0Ch] //function argument
        56                  push   esi       // save non-volatile registers
```

Table 5 below shows an example object code for a relevant portion of the hello program that includes the memory addresses, functions, offsets, opcodes, and the assembly language with the function getPrintItem( ). Table 6 further below shows an example object code for a relevant portion of the hello program that includes the memory addresses, functions, offsets, opcodes, and the assembly language with the function getPrintItem2( ). As part of step 826 the object codes may be compared in detail.

TABLE 5

| Absolute Memory Address | Function + Offset | Opcode | Assembly |
|---|---|---|---|
| 0x804846d | <main+153>: | popa | |
| 0x804846e | <main+154>: | cld | |
| 0x804846f | <main+155>: | ret | |
| 0x8048470 | <getPrintItem>: | push | %ebp |
| 0x8048471 | <getPrintItem+1>: | mov | %esp,%ebp |
| 0x8048473 | <getPrintItem+3>: | mov | 0x8(%ebp), %eax |
| 0x8048476 | <getPrintItem+12>: | movl | $0x77206968, (%eax) |
| 0x804847c | <getPrintItem+19>: | movl | $0x646c726f, 0x4(%eax) |
| 0x8048483 | <getPrintItem+23>: | movb | $0x0, 0x8(%eax) |
| 0x8048488 | <getPrintItem+24>: | pop | %ebp |
| 0x8048489: | nop | | |

TABLE 6

| | | | |
|---|---|---|---|
| 0x804848a: | nop | | |
| 0x804848b: | nop | | |
| 0x804848c | <getPrintItem2>: | push | %ebp |
| 0x804848d | <getPrintItem2+1>: | mov | %asp, %ebp |
| 0x804848f | <getPrintItem2+3>: | mov | 0x8(%ebp), %eax |
| 0x8048492 | <getPrintItem2+6>: | movl | $0x20657962, (%eax) |
| 0x8048498 | <getPrintItem2+12>: | movl | $0x6c726f77, 0x4($eax) |
| 0x804849f | <getPrintItem2+19>: | movw | $0x64, 0x8(%eax) |
| 0x80484a5 | <getPrintItem2+25>: | pop | %ebp |
| 0x80484a6 | <getPrintItem2+26>: | ret | |

In step 828, virtual master arbiter may compute a value of an offset using metadata. The offset from the stack pointer may be calculated relative to the relevant absolute addresses in the physical memory (e.g., RAM). The object code may start with a stack pointer that points to a relative address of zero in a memory. Subsequent lines of code may be referenced using an offset from the stack pointer. The offset may be calculated by subtracting consecutive absolute memory addresses. Thus, as an example, Table 3 shows absolute addresses 0x808419 and 0x808417; for these absolute addresses the offset calculation may be: 0x8048419x8048417=2-->main+67+2=main+69.

In the example shown in Tables 5 and 6, the displacement needed for the call is the address of GetPrintItem2( ) minus the address of the next instruction. This is equivalent to the address of the target minus the address of the relocation plus the value stored. 0x804848c-0x80484406=0x86 (same as 0x804848c-0x804401-4). However, this simple offset calculation will not work, as the CALL address is relative to the next instruction, not the start of the offset bytes halfway into an opcode. This is where the −4 comes in: the result of the relocation is added to the field being padded. By subtracting 4 from the address, the displacement becomes relative to the end of the instruction, and the call ends up where it should go. This way, the object code for replacement may be applied or patched properly.

With continued reference to FIG. 8, in step 830, a code handler (e.g., updater 428 of FIG. 4) may determine whether it is safe to apply the patch or replace the object code. If it is, then in step 832, the CPU corresponding to the device receiving the modified or replacement object code may be halted. And, in step 840, the object code may be modified or replaced. In this example, after the CPU is halted, appropriate operating system commands (e.g., for Linux, GDB commands) may be used to set values at memory addresses. Thus, as an example, the commands may be: Set *0x8048401=0xE8 (CALL assembly opcode); Set *0x8048402=0x86 (memory relocation of getPrintItem2( ) function). In the Linux operating system example, open( ) the dev/mem device command may be used to access the physical memory, and then the seek( ) method for the file objects may be used to set the file pointer to the right location. Next, the write( ) method may be used to change the value. Tables 7 and 8 show the change to the CALL function at address 0x8048401 as part of this example.

TABLE 7

Main ( ) at hello.c:14
14          x8048489
(gdb) x/20i $pc - 20

| | | | |
|---|---|---|---|
| 0x80483f2 | <main+30>: | movl | $0x0, -0x10(%ebp) |
| 0x80483f9 | <main+37>: | jmp | 0x8048421 <main+77> |
| 0x80483fb | <main+39>: | mov | -0x8(%ebp), %eax |
| 0x80483fe | <main+42>: | mov | %eax, (%esp) |
| 0x8048401 | <main+45>: | call | 0x8048470 <getPrintItem> |
| 0x8048406 | <main+50>: | lea | -0x1f(%ebp), %eax |
| 0x8048409 | <main+53>: | mov | %eax, (%esp) |
| 0x804840c | <main+56>: | call | 0x80482e4 <puts@plt> |
| 0x8048411 | <main+61>: | movl | $0xf, ($esp) |
| 0x8048418 | <main+68>: | call | 0x80482d4 <sleep@plt> |
| 0x804841d | <main+73>: | addl | $0x1, -0x10(%ebp) |
| 0x8048421 | <main+77>: | cmpl | $0x13, -0x10(%ebp) |
| 0x8048425 | <main+81>: | jle | 0x80483fb <main+39> |
| 0x8048427 | <main+83>: | cmpl | $0x1, -0xc(%ebp) |
| 0x804842b | <main+87>: | jne | 0x8048462 <main+142> |
| 0x804842d | <main+89>: | movl | $0x0, -0x10(%ebp) |
| 0x8048434 | <main+96>: | jmp | 0x804845c <main+136> |
| 0x8048436 | <main+98>: | mov | -0x8(%ebp), %eax |
| 0x8048439 | <main+101>: | mov | %eax, (%esp) |

TABLE 8

| | | | |
|---|---|---|---|
| 0x080483ef | <main+27>: | mov | %eax, -0x8(%ebp) |
| 0x080483f2 | <main+30>: | movl | $0x0, -0x10(%ebp) |
| 0x080483f9 | <main+37>: | jmp | 0x8048421 <main+77> |
| 0x080483fb | <main+39>: | mov | -0x8(%ebp), %eax |
| 0x080483fe | <main+42>: | mov | %eax, (%esp) |
| 0x08048401 | <main+45>: | call | 0x804848c <getPrintItem2> |
| 0x08048406 | <main+50>: | lea | -0x11(%ebp), %eax |
| 0x0804809 | <main+53>: | mov | %eax, (%esp) |
| 0x0804840c | <main+56>: | Call | 0x80482e4 <puts@plt> |
| 0x08048411 | <main+61>: | movl | $0xf, (%esp) |
| 0x08048418 | <main+68>: | Call | 0x80482d4 <sleep@plt> |
| 0x0804841d | <main+73>: | addl | $0x1, -0x10(%ebp) |
| 0x08048421 | <main+77>: | Compl | $0x13, -0x10(%ebp) |
| 0x08048425 | <main+81>: | Jle | 0x80483fb <main+39> |
| 0x08048427 | <main+83>: | cmpl | $0x1, -0xc(%ebp) |
| 0x0804842b | <main+87>: | Jne | 0x8048462 <main+142> |
| 0x0804842d | <main+89>: | Movl | $0x0, -0x10(%ebp) |
| 0x08048434 | <main+96>: | Jmp | 0x804845c <main+136> |

If in step 830 it is determined that it is not safe to apply the patch or replace the object code, then in step 834 code handler may enter a loop to wait and retry. In step 836, if the maximum number of retries is exceeded, then the code handler may log the attempt and continue to the next function in step 844. If the patch is applied or the object code is replaced, then in step 842 the algorithm whose object code was modified may be characterized and the differences in performance or other aspects, as desired, may be logged. In step 850, the code handler may determine whether the last function or data object has been processed and if so, then in step 852 the code handler may end the processing related to modification or replacement of object code until needed again.

Figure 9:
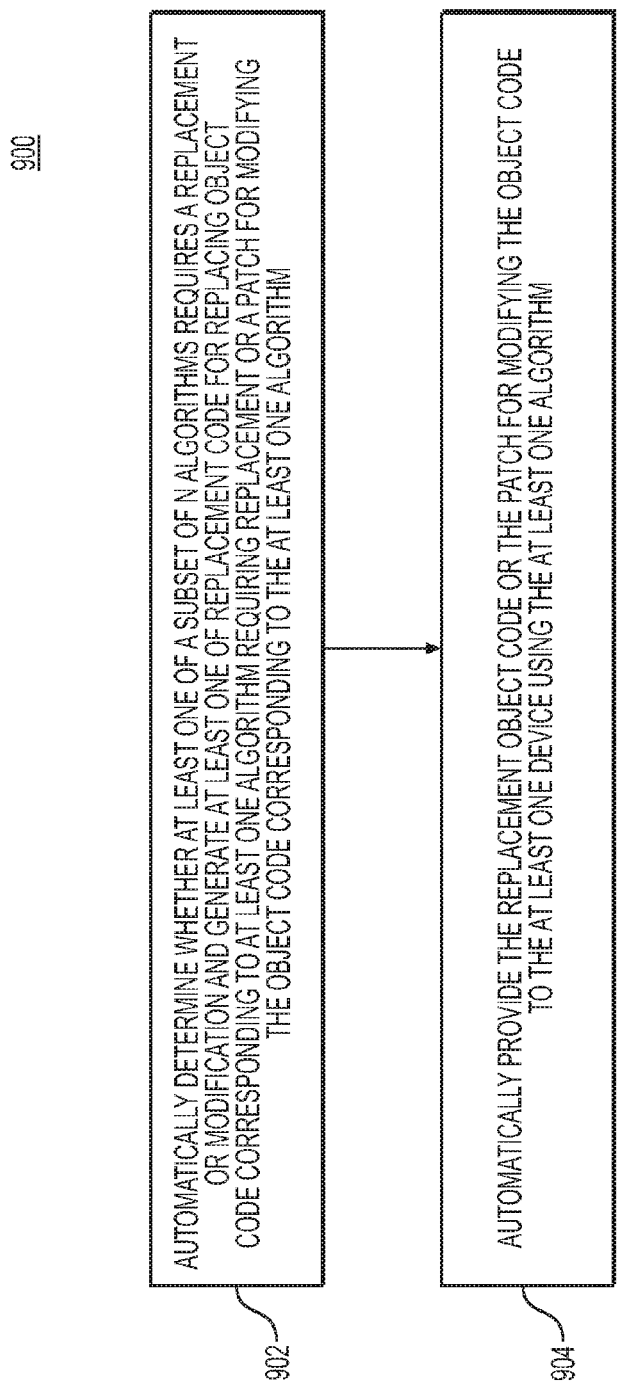
FIG. 9 is a diagram illustrating another method for automatic object code replacement and patching in accordance with one example.

FIG. 9 is a diagram showing a flowchart 900 of a method for automatic object code replacement and patching in accordance with one example. In step 902, a controller, for example controller 210 associated with virtual master arbiter 200 may automatically determine whether at least one of a subset of N algorithms (e.g., as described with respect to FIGS. 1-6) require a replacement or modification and generate at least one of replacement code for replacing object code corresponding to at least one algorithm requiring replacement or a patch for modifying the object code corresponding to the at least one algorithm. In one example, this step may include some of the processing associated with step 506 corresponding to flowchart 500 as described in relation to FIG. 5. In this example, the generation of replacement object code or a patch may include some of the steps described earlier with respect to FIG. 8. As an example, steps 824, 826, and 828 may be performed by a processor (e.g., processor 410 of FIG. 4) executing a code handler (e.g., updater 428 of FIG. 4).

In step 904, a processor (e.g., processor 410 of FIG. 4) executing a code handler (e.g., updater 428 of FIG. 4) may automatically provide the replacement code or the patch for modifying the object code to the at least one device using the at least one algorithm. This step may include the code handler performing steps 830, 832, and 840. Although the steps corresponding to flowchart 900 are described as being performed by a processor associated with a device that requires replacement code or a patch, some or all of these steps may be performed by a processor associated with a different device or system.

Thus, in conclusion, the present disclosure relates to an information handling system (IHS) including M augmented sensors, where M is a positive integer, and where each of the M augmented sensors is configured to process at least a plurality of inputs using at least one algorithm from a set of N algorithms, where N is a positive integer, and where each of the algorithms has a corresponding object code stored in a memory corresponding to at least one of the M augmented sensors. The IHS may further include O controllers, where O is a positive integer, and where each of the O controllers is further configured to, without any direct input from any of L hosts, where L is a positive integer, and where each of the L hosts is configured to provide at least one service to the IHS, automatically determine whether at least one of a subset of the N algorithms requires a modification and generate at least one of replacement object code for replacing object code corresponding to at least one algorithm requiring modification or a patch for modifying the object code corresponding to the at least one algorithm requiring modification, and automatically provide the replacement object code or the patch for modifying the object code corresponding to the at least one algorithm requiring modification to at least one device using the at least one algorithm requiring the modification.

Each of the N algorithms may be configured to process a plurality of inputs to generate at least one result, and where each of the O controllers may further be configured to process at least one of the subset of the N algorithms or a subset of at least N results to generate at least one entry for a ledger comprising at least one header and at least one ledger value corresponding to the at least one of the subset of the N algorithms or the subset of the at least N results. In addition, each of a subset of the O controllers may further be configured to, based on at least the replacement object code corresponding to the at least one algorithm requiring modification or the patch for modifying the object code corresponding to the at least one algorithm requiring modification, automatically generate at least one modified header and at least one modified ledger value for the at least one ledger entry. The ledger may include a blockchain, and the at least one ledger entry may comprise at least a portion of a block corresponding to the blockchain. At least a subset of the N results may be provided to at least one of the O controllers at a predetermined frequency. M augmented sensors may further be configured to independently validate the replacement object code or the patch for modifying the object code. This process may include an augmented sensor logging the results and applying certain criteria to determine the efficacy of the replacement object code or the patch. The M augmented sensors may further be configured to transmit a message to each of the O controllers regarding the replacement object code or the patch for modifying the object code. This message may indicate to the relevant O controller that the replacement code or the modification is working well. Each of the O controllers may further be configured to process the message and substantially simultaneously provide the replacement object code or the patch for modifying the object code to a plurality of the M devices.

In another aspect, the present disclosure relates to a method in an information handling system (IHS) including M devices, where M is a positive integer, and where each of the M devices is configured to process at least a plurality of inputs using at least one algorithm from a set of N algorithms, where N is a positive integer, and where each of the algorithms has a corresponding object code stored in a memory corresponding to at least one of the M devices. The method may include automatically determining whether at least one of a subset of the N algorithms requires replacement or a modification and generating at least one of replacement object code for replacing object code corresponding to at least one algorithm requiring replacement or a patch for modifying the object code corresponding to the at least one algorithm. The method may further include automatically providing the replacement object code or the patch for modifying the object code corresponding to the at least one algorithm requiring modification to at least one device using the at least one algorithm.

The IHS may further comprise O controllers, where O is a positive integer, and L hosts, where L is a positive integer, and where the method may further comprise at least one of the O controllers, without any direct input from any of L hosts, processing at least one of the subset of the N algorithms or a subset of at least N results to generate at least one entry for a ledger comprising at least one header and at least one ledger value corresponding to the at least one of the subset of the N algorithms or the subset of the at least N results. The method may further include the at least one of the O controllers automatically generating at least one modified header and at least one modified ledger value for the at least one ledger entry based on at least the replacement object code corresponding to the at least one algorithm requiring modification or the patch for modifying the object code corresponding to the at least one algorithm requiring modification. The method may further include at least one of: (1) validating the replacement object code or the patch for modifying the object code, (2) transmitting a message to each of the O controllers regarding the replacement object code or the patch for modifying the object code, or (3) substantially simultaneously providing the replacement object code or the patch for modifying the object code to a plurality of the M devices.

It is to be understood that the methods, modules, and information handling systems depicted herein are merely exemplary. In general, although blockchain based systems are described as examples, other ledger-chained arrangements may be used. As an example, any mechanism that provides an ability to manage distributed updates to algorithms stored in middleware devices may be used. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media. The term "non-transitory media" as used herein refers to any media storing data and/or instructions that cause a machine, such as processor 214 or processor 410, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media. Non-transitory media is distinct from, but can be used in conjunction with, transmission media. Transmission media is used for transferring data and/or instruction to or from a machine, such as processor 214 or processor 410 that may be part of an information handling system. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. In addition, as used herein, the term "in response" is not limited to a direct and an immediate action based on another action. Instead, this term includes actions that may occur as part of a sequence of operations in which only a subset of the actions, such as a first action, may occur based on another action and the later actions may occur because they may be required to complete a method or that may be part of a sequence of actions that flow from the first action.

What is claimed:

1. An information handling system (IHS) having at least one processor comprising:
   M augmented sensors, wherein M is a positive integer greater than one, and wherein each of the M augmented sensors is configured to process at least a plurality of inputs using at least one algorithm from a set of N algorithms, wherein N is a positive integer greater than one, and wherein each of the algorithms has a corresponding object code stored in a memory corresponding to at least one of the M augmented sensors; and
   O controllers, wherein O is a positive integer greater than one, and wherein each of the O controllers is further configured to, without any direct input from any of L hosts, wherein L is a positive integer greater than one, and wherein each of the L hosts is configured to provide at least one service to the IHS, automatically determine whether at least one of a subset of the N algorithms requires a modification and generate at least one of replacement object code for replacing object code corresponding to at least one algorithm requiring modification or a patch for modifying the object code corresponding to the at least one algorithm requiring modification, and automatically provide the replacement object code or the patch for modifying the object code corresponding to the at least one algorithm requiring modification to at least one device using the at least one algorithm requiring the modification.

2. The IHS of claim 1, wherein each of the N algorithms is configured to process a plurality of inputs to generate at least one result, and wherein each of the O controllers is configured to process at least one of the subset of the N algorithms or a subset of at least N results to generate at least one entry for a ledger comprising at least one header and at least one ledger value corresponding to the at least one of the subset of the N algorithms or the subset of the at least N results.

3. The IHS of claim 2, wherein each of a subset of the O controllers is further configured to, based on at least the replacement object code corresponding to the at least one algorithm requiring modification or the patch for modifying the object code corresponding to the at least one algorithm requiring modification, automatically generate at least one modified header and at least one modified ledger value for the at least one ledger entry.

4. The IHS of claim 2, wherein the ledger comprises a blockchain, and wherein the at least one ledger entry comprises at least a portion of a block corresponding to the blockchain.

5. The IHS of claim 2, wherein at least a subset of the N results is provided to at least one of the O controllers at a predetermined frequency.

6. The IHS of claim 1, wherein the at least one of the M augmented sensors is further configured to independently validate the replacement object code or the patch for modifying the object code.

7. The IHS of claim 6, wherein the at least one of the M augmented sensors is further configured to transmit a message to each of the O controllers regarding the replacement object code or the patch for modifying the object code.

8. The IHS of claim 7, wherein each of the O controllers is further configured to process the message and substantially simultaneously provide the replacement object code or the patch for modifying the object code to a plurality of the M devices.

9. A method in an information handling system (IHS) having at least one processor comprising M devices, wherein M is a positive integer greater than one, and wherein each of the M devices is configured to process at least a plurality of inputs using at least one algorithm from a set of N algorithms, wherein N is a positive integer greater than one, and wherein each of the algorithms has a corresponding object code stored in a memory corresponding to at least one of the M devices, O controllers, wherein O is a positive integer greater than one, and L hosts, wherein L is a positive integer greater than one, the method comprising:
   at least one of the O controllers, without any direct input from any of the L hosts, automatically determining whether at least one of a subset of the N algorithms requires replacement or a modification and generating at least one of replacement object code for replacing object code corresponding to at least one algorithm requiring replacement or a patch for modifying the object code corresponding to the at least one algorithm; and
   automatically providing the replacement object code or the patch for modifying the object code corresponding to the at least one algorithm requiring modification to at least one device using the at least one algorithm.

10. The method of claim 8, wherein the method further comprising the at least one of the O controllers, without any direct input from any of the L hosts, processing at least one of the subset of the N algorithms or a subset of at least N results to generate at least one entry for a ledger comprising at least one header and at least one ledger value corresponding to the at least one of the subset of the N algorithms or the subset of the at least N results.

11. The method of claim 9 further comprising the at least one of the O controllers automatically generating at least one modified header and at least one modified ledger value for the at least one ledger entry based on at least the replacement object code corresponding to the at least one algorithm requiring modification or the patch for modifying the object code corresponding to the at least one algorithm requiring modification.

12. The method of claim 9, wherein the ledger comprises a blockchain, and wherein the at least one ledger entry comprises at least a portion of a block corresponding to the blockchain.

13. The method of claim 9 further comprising independently validating the replacement object code or the patch for modifying the object code.

14. The method of claim 13 further comprising transmitting a message to each of the O controllers regarding the replacement object code or the patch for modifying the object code.

15. The method of claim 14 further comprising substantially simultaneously providing the replacement object code or the patch for modifying the object code to a plurality of the M devices.

16. A non-transitory computer-readable medium comprising instructions corresponding to a method in an information handling system (IHS) having at least one processor comprising M devices, wherein M is a positive integer greater than one, and wherein each of the M devices is configured to process at least a plurality of inputs using at least one algorithm from a set of N algorithms, wherein N is a positive integer greater than one, and wherein each of the algorithms has a corresponding object code stored in a memory corresponding to at least one of the M devices, O controllers, wherein O is a positive integer greater than one, and L hosts, wherein L is a positive integer greater than one, the method comprising:

at least one of the O controllers, without any direct input from any of the L hosts, automatically determining whether at least one of a subset of the N algorithms requires replacement or a modification and generating at least one of replacement object code for replacing object code corresponding to at least one algorithm requiring replacement or a patch for modifying the object code corresponding to the at least one algorithm; and automatically providing the replacement object code or the patch for modifying the object code corresponding to the at least one algorithm requiring modification to at least one device using the at least one algorithm.

17. The non-transitory computer-readable medium of claim 16, wherein the method further comprising the at least one of the O controllers, without any direct input from any of the L hosts, processing at least one of the subset of the N algorithms or a subset of at least N results to generate at least one entry for a ledger comprising at least one header and at least one ledger value corresponding to the at least one of the subset of the N algorithms or the subset of the at least N results.

18. The non-transitory computer-readable medium of claim 17, wherein the method further comprising the at least one of the O controllers automatically generating at least one modified header and at least one modified ledger value for the at least one ledger entry based on at least the replacement object code corresponding to the at least one algorithm requiring modification or the patch for modifying the object code corresponding to the at least one algorithm requiring modification.

19. The non-transitory computer-readable medium of claim 17, wherein the ledger comprises a blockchain, and wherein the at least one ledger entry comprises at least a portion of a block corresponding to the blockchain.

20. The non-transitory computer-readable medium of claim 17, wherein the method further comprising:

validating the replacement object code or the patch for modifying the object code;

transmitting a message to each of the O controllers regarding the replacement object code or the patch for modifying the object code; and substantially simultaneously providing the replacement object code or the patch for modifying the object code to a plurality of the M devices.

\* \* \* \* \*